United States Patent [19]

Rinderle et al.

[11] Patent Number: 4,609,527
[45] Date of Patent: Sep. 2, 1986

[54] POWDER CONSOLIDATION AND MACHINING

[76] Inventors: James R. Rinderle, 19 Scenery Rd., Wilkinsburg, Pa. 15221; Michael K. Pratt, 1018 Wellington Pl., Aberdeen, N.J. 07747

[21] Appl. No.: 737,540

[22] Filed: May 24, 1985

[51] Int. Cl.$^4$ .............................................. B22F 1/00
[52] U.S. Cl. ....................................... 419/32; 419/37; 419/38; 419/53; 419/54; 419/55; 264/63; 264/125; 264/332; 425/78; 425/404
[58] Field of Search ...................... 419/32, 38, 37, 53, 419/54, 55; 264/63, 125, 332; 425/78, 404

[56] References Cited

U.S. PATENT DOCUMENTS

| | | | |
|---|---|---|---|
| 4,011,291 | 3/1977 | Curry | 419/37 |
| 4,158,688 | 6/1979 | Pett et al. | 419/37 |
| 4,478,790 | 10/1984 | Hüther et al. | 419/37 |
| 4,530,815 | 7/1985 | Inagaki | 419/38 |

Primary Examiner—Stephen J. Lechert, Jr.
Attorney, Agent, or Firm—Walter J. Blenko, Jr.; Arnold B. Silverman

[57] ABSTRACT

The specification discloses a powder process in which metal or ceramic particles are mixed with a binder such as ultra high molecular weight polyethylene powder and are compacted. The compacted shape is heated to a temperature near the melting point of the binder to consolidate the binder and produce a green shape. The green shape is formed and the binder is removed. Thereafter, the shape is sintered to form a final part.

7 Claims, No Drawings

POWDER CONSOLIDATION AND MACHINING

This application relates to the production of metal and ceramic parts by powder consolidation. More particularly, it relates to the production of metal or ceramic parts in which metal or ceramic particles are mixed with a binder, shaped, consolidated, and machined, and are then sintered.

Manufacture of metal or ceramic parts by shaping of metal particles by compaction followed by sintering is well known. Shaping of the powder is ordinarily done in a die or by extrusion or by slip casting. Because of the high cost of a die, a substantial number of parts must ordinarily be included in a production run to make the process economically sound. Moreover, the limitations of die shaping preclude numerous final part configurations having such features as undercuts and non-axial holes.

We form parts from metal or ceramic powders by a process which overcomes significant disadvantages of the prior art. We blend powder and a binder to form a mixture. Thereafter, we form the mixture into a shape and heat the shape to an extent sufficient to consolidate the binder. By application of heat during compaction, it may be possible to compact and consolidate the material in a single step. Further, we machine the green shape, extract the binder and then sinter the shape to form a completed part. We prefer to use a binder which comprises an ultra high weight polyethylene material. Preferably, we consolidate the binder by heating the shape to a temperature of about 300° F. Thereafter, we machine the green shape to desired size and configuration. We then extract the binder from the shape by heating the shape to an elevated temperature in the order of about 330° C. to 400° C. for an extended period or by use of solvents. We may heat the shape for a period of about twelve hours or more. Thereafter, we sinter the shape to form the completed product.

The process permits the powders to be shaped economically and then machined while still green, i.e., prior to sintering. In that manner, a shape can be produced quickly and cheaply from the mixture of powder and binder. After machining, the binder is removed and the shape is sintered to give it the requisite properties.

Other details, objects and advantages of our invention will become more apparent as the following description of a present preferred embodiment thereof proceeds.

A wide variety of binders and metals and ceramics can be used for carrying out the process. A metal powder such as sponge iron was blended with the ultra high molecular weight polyethylene powder. Mixtures were prepared having between 2.5% and 10.0% by weight of binder. The mixture was consolidated in a cylindrical die at pressures carrying from 5 tons per square inch to 40 tons per square inch. It was found that compaction density rises rapidly at low pressures but at progressively lower rates as the pressure increases. Even at pressures in the range of 5 tons per square inch, it was found that there was no difficulty in handling the shapes or removing them from the die. Slight elastic recovery was noticed upon ejection of the shape from the die.

The compaction causes the polyethylene particles to be deformed sufficiently to interlock and bind the particles together. The binding is not strong enough, however, to permit machining of the shapes. After removal from the die, the compacted shapes were heated to a temperature slightly above the melting point of the binder. It was found that a temperature in the order of 300° F. was suitable for that purpose. The temperature causes the binder to flow and to give to the shape greater continuity and higher strength than occur under merely pressure compaction alone.

Following consolidation of the binder, the shape was machined to obtain the desired final dimensions. After machining, the part was heated to a higher temperature—in the order of 330° C. to 400° C.—and maintained at that temperature for an extended period of time (in excess of twelve hours).

It was observed that shapes having higher concentrations of plastic have smoother surfaces after machining. Lower percentages of plastic yield rough and pitted machined surfaces.

It was found that even after binder removal and sintering there was some shrinkage while maintaining substantial dimensional stability from one part to another. The process makes it possible, therefore, to form parts of materials which are difficult to machine and to shape the part before sintering. The process thereby makes possible the production of parts in small quantities which cannot be economically shaped by conventional methods and which are difficult to machine after sintering.

While we have illustrated and described a present preferred embodiment of our invention, it is to be understood that we do not limit ourselves thereto, and that the invention may be otherwise variously practiced within the scope of the following claims.

We claim:

1. The process of forming machined metal parts from powder which comprises the steps of blending powder and a binder to form a mixture, shaping the mixture, heating the shape to an amount sufficient to consolidate the binder, forming the shape, extracting the binder, and then sintering the shape.

2. The process of claim 1 in which the forming is done by machining.

3. The process of claim 1 in which the binder comprises an ultra high molecular weight polyethylene material.

4. The process of claim 3 in which the forming is done by machining.

5. The process of claim 3 in which the heating step is carried out at a temperature of about 300° F.

6. The process of claim 5 in which the binder is extracted by a further heating step in which the shape is heated to a temperature in the range of about 330° C. to 400° C.

7. The process of forming machined parts from powder which comprises
   blending a powder selected from the group consisting of metal powder and ceramic powder with an organic binder,
   compacting the mixture of powder and binder to a shape by pressing the mixture in a mold,
   consolidating the compacted mixture by heating to a temperature sufficient to cause the binder to flow and to hold the particles together,
   machining the consolidated shape,
   extracting the binder, and
   sintering the machined shape.

* * * * *